United States Patent
Bissell et al.

(10) Patent No.: US 11,193,702 B2
(45) Date of Patent: Dec. 7, 2021

(54) PHASE CHANGE MATERIAL-BASED ENHANCEMENT FOR REVERSED-CYCLE DEFROSTING IN VAPOUR COMPRESSION REFRIGERATION SYSTEMS

(71) Applicant: SUNAMP LIMITED, Lothian (GB)

(72) Inventors: Andrew John Bissell, Lothian (GB); Maurizio Zaglio, Lothian (GB)

(73) Assignee: SUNAMP LIMITED, Edinburgh (GB)

( * ) Notice: Subject to any disclaimer, the term of this patent is extended or adjusted under 35 U.S.C. 154(b) by 93 days.

(21) Appl. No.: 16/313,017

(22) PCT Filed: Jun. 23, 2017

(86) PCT No.: PCT/GB2017/051845
§ 371 (c)(1),
(2) Date: Dec. 22, 2018

(87) PCT Pub. No.: WO2017/221025
PCT Pub. Date: Dec. 28, 2017

(65) Prior Publication Data
US 2019/0226735 A1 Jul. 25, 2019

(30) Foreign Application Priority Data
Jun. 23, 2016 (GB) ...................... 1610977

(51) Int. Cl.
*F25B 47/02* (2006.01)
*C09K 5/06* (2006.01)
(Continued)

(52) U.S. Cl.
CPC ............ *F25B 47/022* (2013.01); *C09K 5/063* (2013.01); *F25B 41/20* (2021.01); *F25B 47/025* (2013.01);
(Continued)

(58) Field of Classification Search
CPC .. F25B 47/022; F25B 47/025; F25B 2400/24; F25B 41/04; F25B 2400/0403;
(Continued)

(56) References Cited

U.S. PATENT DOCUMENTS 2,526,032 A 10/1950 La Porte
2,641,908 A 6/1953 La Porte
(Continued)

FOREIGN PATENT DOCUMENTS

CN 101413744 A 4/2009
CN 101871706 A 10/2010
(Continued)

OTHER PUBLICATIONS

Russian Office Action, Application No. 2019100576 dated Jul. 22, 2020.
(Continued)

*Primary Examiner* — Joseph F Trpisovsky
(74) *Attorney, Agent, or Firm* — Moser Taboada

(57) ABSTRACT

There is provided a thermal energy storage system suitable for use with systems adapted to transfer heat from at least one heat source to at least one heat sink (heat transfer system), comprising at least one thermal energy storage unit. There is additionally provided a thermal energy storage system for use with a heat pump, or vapour compression refrigeration systems, a method of defrosting evaporators without affecting the energy delivered in the condenser before the defrosting cycle, and system architecture for defrosting evaporators in heat pumps or in vapour compression refrigeration systems.

9 Claims, 6 Drawing Sheets enhanced reversed-cycle defrosting with bypass of thermal store, de-frosting phase

(51) Int. Cl.
    *F28D 7/02*     (2006.01)
    *F28D 20/02*     (2006.01)
    *F25B 41/20*     (2021.01)

(52) U.S. Cl.
    CPC .............. *F28D 7/02* (2013.01); *F28D 20/021* (2013.01); *F24D 2200/12* (2013.01); *F24D 2200/123* (2013.01); *F24D 2220/10* (2013.01); *F25B 2400/24* (2013.01); *F28F 2215/00* (2013.01); *Y02E 60/14* (2013.01)

(58) Field of Classification Search
    CPC ........ F25B 25/005; F28D 7/02; F28D 20/021; F24D 2200/10; F24D 2200/12; F24D 2200/123; F28F 2215/00; C09K 5/063
See application file for complete search history.

(56) References Cited

U.S. PATENT DOCUMENTS

| | | | | |
|---|---|---|---|---|
| 2,801,524 | A | | 8/1957 | Fifield |
| 5,052,191 | A | * | 10/1991 | Shapiro-Baruch .... F25B 47/025 62/238.7 |
| 5,165,250 | A | * | 11/1992 | Nagatomo ............ F24F 5/0017 62/158 |
| 5,269,151 | A | | 12/1993 | Khanh |
| 2006/0032623 | A1 | * | 2/2006 | Tsubone ................ F25B 25/005 165/202 |
| 2008/0319126 | A1 | | 12/2008 | Fell |
| 2013/0312437 | A1 | | 11/2013 | Davies et al. |
| 2014/0130532 | A1 | | 5/2014 | Jiunn |
| 2014/0338389 | A1 | | 11/2014 | Clough et al. |
| 2015/0191182 | A1 | * | 7/2015 | Abou Eid ............... F25B 41/20 62/80 |

FOREIGN PATENT DOCUMENTS

| | | |
|---|---|---|
| CN | 102798214 A | 11/2012 |
| DE | 3240353 | 5/1984 |
| DE | 3240353 A1 | 5/1984 |
| DE | 102014103108 A1 | 9/2015 |
| EP | 0449641 A3 | 10/1991 |
| EP | 0485203 A1 | 5/1992 |
| GB | 2488331 A | 8/2012 |
| JP | S5887070 U | 6/1983 |
| JP | S62294856 A | 12/1987 |
| JP | H02298771 A | 12/1990 |
| JP | H0384370 A | 4/1991 |
| JP | H0743028 A | 2/1995 |
| JP | 2009287903 A | 12/2009 |
| JP | 2016041987 A | 3/2016 |
| KR | 19980082835 A | 12/1998 |
| WO | WO2012008797 A2 | 1/2012 |

OTHER PUBLICATIONS

International Search Report, dated Sep. 22, 2017 for Application No. PCT/GB2017/051845.

* cited by examiner

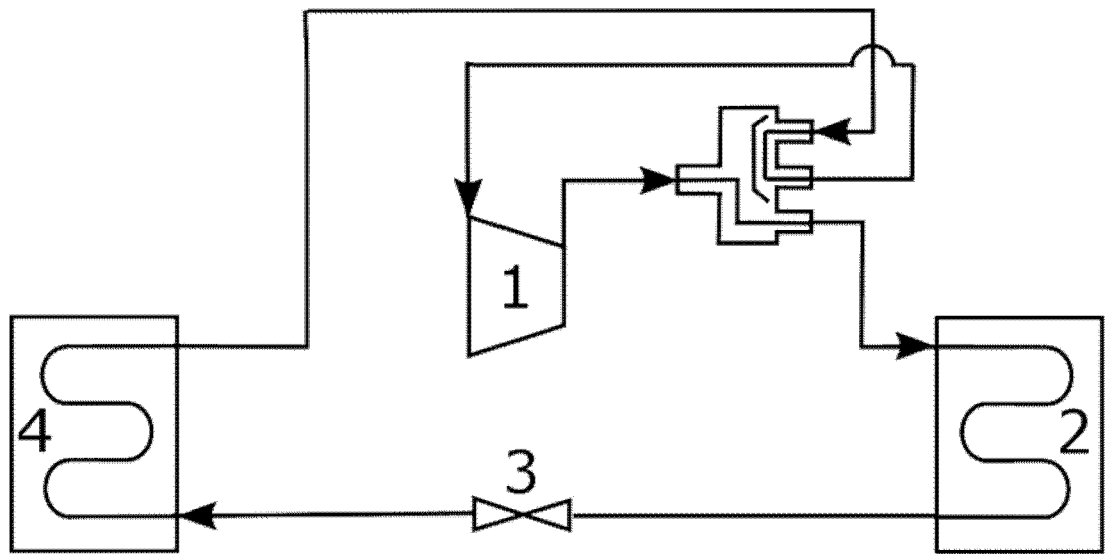
Figure 1: vapour compression refrigeration cycle
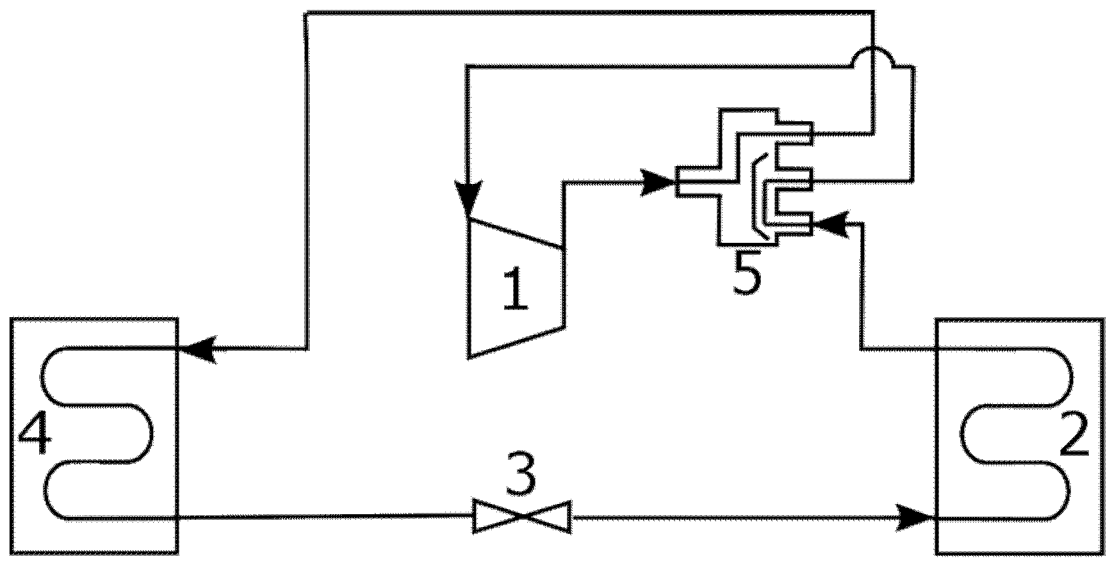
Figure 2: reverse-cycle defrosting

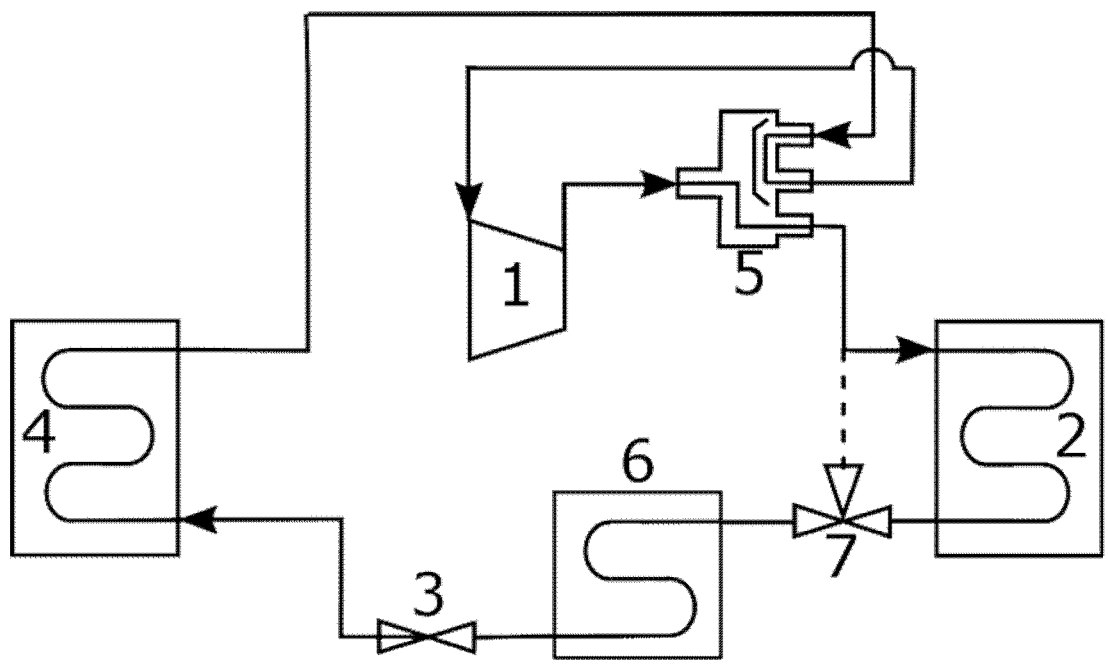
Figure 3: position of thermal storage in the vapour compression refrigeration cycle
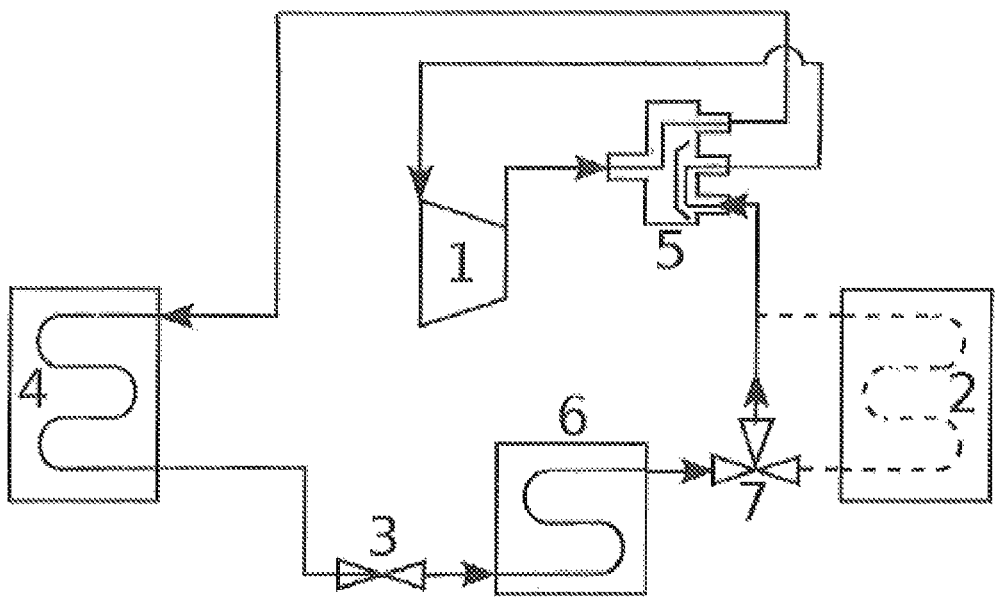
Figure 4: enhanced reversed-cycle defrosting

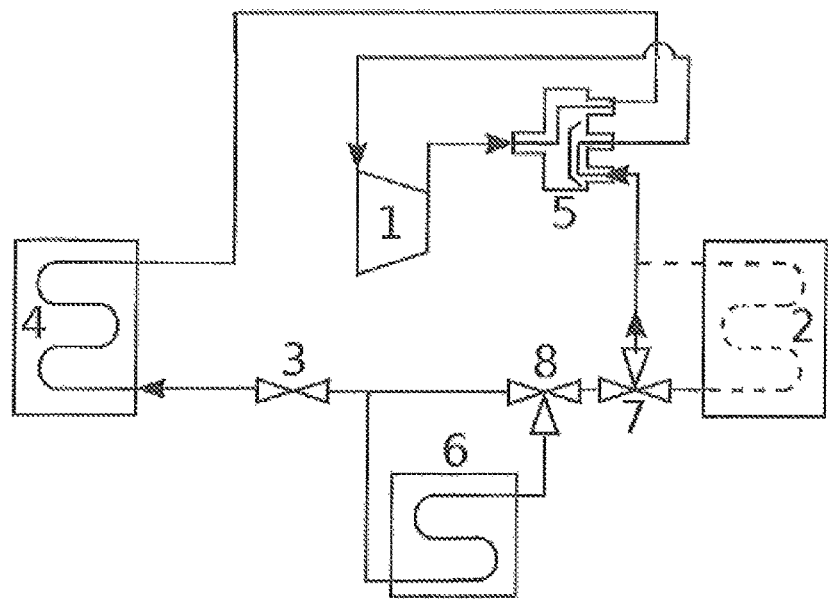
Figure 5: enhanced reversed-cycle defrosting with bypass of thermal store, normal operation
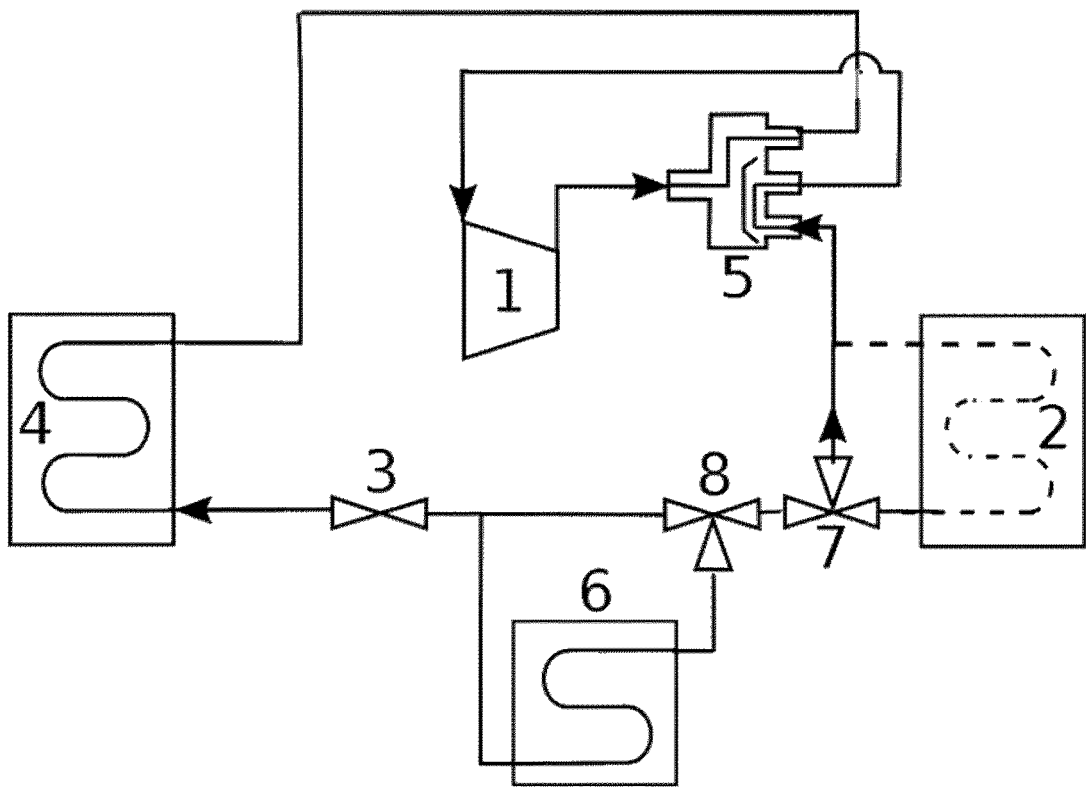
Figure 6: enhanced reversed-cycle defrosting with bypass of thermal store, de-frosting phase

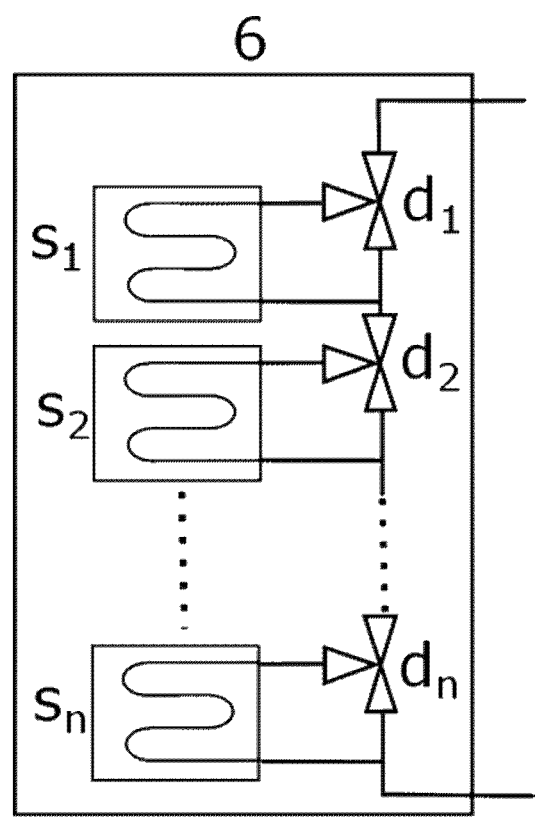
Figure 7: phase change material thermal store, alternative architecture

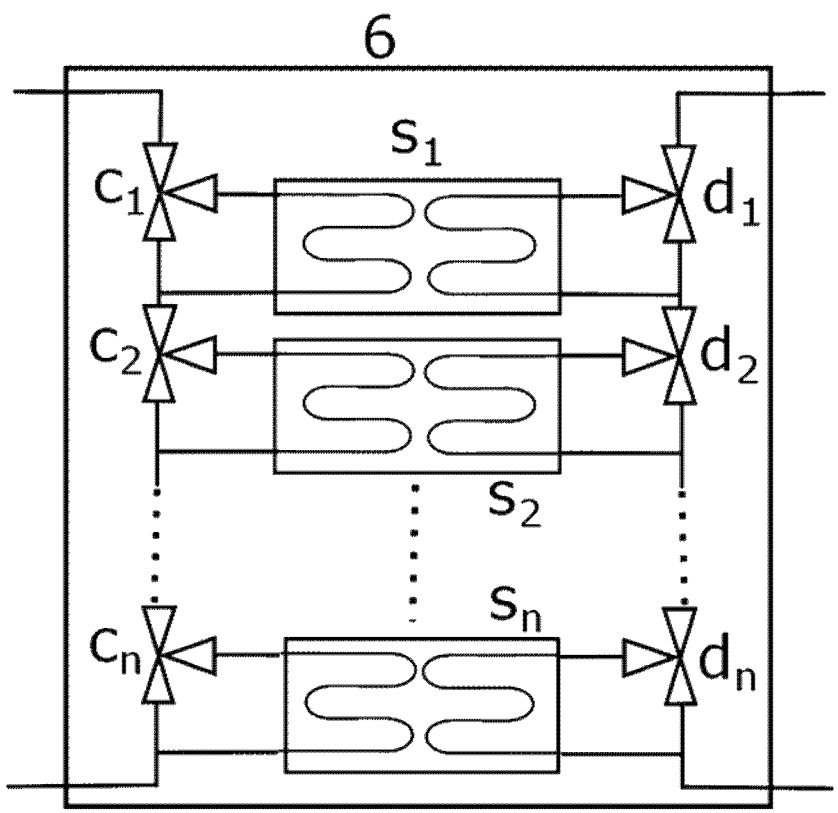
Figure 8: phase change material thermal store, alternative architecture

PHASE CHANGE MATERIAL-BASED ENHANCEMENT FOR REVERSED-CYCLE DEFROSTING IN VAPOUR COMPRESSION REFRIGERATION SYSTEMS

FIELD OF THE INVENTION

The present invention relates to a defrost method and architecture aiming to defrosting evaporators in heat pumps and any vapour compression refrigeration systems. The present invention also relates to a thermal energy storage system suitable for use with systems adapted to transfer heat from at least one heat source to at least one heat sink (heat transfer system), comprising at least one thermal energy storage unit. More particularly, the present invention relates to thermal storage systems for use with a heat pump and any vapour compression refrigeration systems to defrosting evaporators without affecting the energy delivered in the condenser before the defrosting cycle. The present invention also relates to thermal energy storage systems for use with a heat pump, or vapour compression refrigeration systems, a method of defrosting evaporators without affecting the energy delivered in the condenser before the defrosting cycle, and system architectures for defrosting evaporators in heat pumps or in vapour compression refrigeration systems.

BACKGROUND TO THE INVENTION

Heat pumps and vapour compression refrigeration systems move heat opposite to the spontaneous direction of heat flow by using external power, e.g. electrical power, to transfer heat from at least one heat source to at least on heat sink. This applies to either increasing the temperature of a heat sink by upgrading the thermal energy from a heat source, or to decreasing the temperature of a heat sink by downgrading the thermal energy from a heat source.

Vapour compression cycles are well known and commonly utilised for different application to move heat from a colder environment to a hotter environment, e.g. heating up a domestic environment, cooling down a car cabin, and to cool air in chiller rooms.

As shown in FIG. 1, a working fluid, typically a refrigerant, is pressurised to a high-temperature and high-pressure vapour state by a compressor (1); the hot and pressurised vapour is then cooled in a condenser (2) where it releases heat and condenses into a mild-temperature and high-pressure liquid or mixture of liquid and vapour; this liquid or mixture of liquid and vapour then enters a pressure-lowering device (3) to become a low-temperature liquid or mixture of vapour and liquid; as a final step, it enters the evaporator (4) where it is heated up and evaporates again before returning to the compressor.

A well-known issue of this technology is that when the ambient temperature surrounding the evaporator reaches frosting conditions, ice forms on the coil reducing the heat transfer rate between the refrigerant and the surrounding air. This could lead to a loss of effectiveness of the evaporator and, if no action is taken, to the arrest of the heat pump or vapour compression refrigeration system.

When frosting conditions are reached and ice starts to form in the evaporator, various methods are known in the art to defrost it. Today, reverse-cycle defrosting is commonly utilised. As shown in FIG. 2, it consists in temporarily revert the flow of the refrigerant by switching the position of a 4-way reversing valve (5), so that the compressor (1) drives the hot and high-pressure vapour into the evaporator (4), now acting as condenser, where it is cooled down while melting the ice.

The high-pressure, mild temperature liquid is successively expanded through the pressure-lowering device (3) before entering the condenser (2), now acting as evaporator, to be heated again. The low-pressure, high temperature vapour then enters the compressor and cycle starts again until all the ice on the evaporator is molten. In case the heat pump or any vapour compression refrigeration system is used in normal operation to heat up a target heat sink connected to the condenser (2), e.g. a water tank to provide hot water, or the circuit of a radiator system to heat up a house, the reverse cycle defrosting has the clear disadvantage that some of the energy previously provided the this heat sink is used to melt the ice on the evaporator, eventually cooling down the hot water tank or the temperature of the radiators reducing the comfort of the internal ambient.

It is therefore desirable to provide an improved defrosting system.

Thus, it would be desirable to provide an improved defrosting system that addresses the issue of frosting without impacting upon associated ancillary systems such as hot water tanks, radiators and the like.

The Applicant has developed a novel thermal energy storage system which includes an improved defrosting system, and which overcomes the issues of the systems of the art.

SUMMARY OF THE INVENTION

According to a first aspect the present invention provides a thermal energy storage system suitable for use with systems adapted to transfer heat from at least one heat source to at least one heat sink (heat transfer system), comprising at least one thermal energy storage unit, wherein said at least one thermal energy storage unit comprises a thermal store comprising a heat exchanger with at least one coil, wherein said at least one coil is surrounded by a suitable phase change material, and wherein said thermal energy storage unit includes means for connection to one-another and/or to one or more components of a heat transfer system.

The present invention also provides a thermal energy storage system in accordance with the first or any other aspect wherein said system comprises at least two thermal energy storage units, wherein at least one thermal energy storage unit comprises a thermal store comprising a heat exchanger with one coil, wherein said one coil is surrounded by a suitable phase change material, wherein at least one further thermal energy storage unit comprises a thermal store comprising a heat exchanger which comprises two or more coils, and wherein each of said thermal energy storage units may optionally and independently include bypass means for the thermal energy store.

The present invention also provides a heat transfer system including one or more thermal energy storage units in accordance with the first aspect, or any other aspects of thermal energy storage systems as detailed herein, wherein said heat transfer system additionally comprises one or more compressors, one or more evaporators, one or more pressure-lowering devices and one or more condensers, and wherein said components are interconnected to one another and/or the one or more thermal energy storage units.

The at least one thermal energy storage unit additionally may include internal metal fins co-located with the one or more coils.

The thermal energy storage system may also comprise at least two thermal energy storage units.

Each of the thermal energy storage units may include a phase change material which may be independently selected from formulations containing any one of or combination of the following: one or more waxes; paraffin; one or more fatty acids or salt hydrates thereof; one or more organic-organic eutectic compounds, one or more organic-inorganic eutectic compounds; one or more inorganic-inorganic eutectic compounds; or one or more hygroscopic materials; or any combination thereof.

The thermal energy storage system may also comprise at least two thermal energy storage units, and wherein each thermal energy storage unit may optionally and independently include bypass means for the thermal energy unit.

The thermal energy storage system may also comprise bypass means for each thermal energy storage unit which may be independently selected from one or more diverter valves, one or more system valves, or one or more solenoid valves.

The thermal energy storage system may also comprise at least two thermal energy storage units, wherein at least one thermal energy storage unit may comprise a thermal store comprising a heat exchanger with one coil, wherein said one coil is surrounded by a suitable phase change material, wherein at least one further thermal energy storage unit comprises a thermal store comprising a heat exchanger that comprises two or more coils, and wherein each of said thermal energy storage units may optionally and independently include bypass means for the thermal energy store.

The thermal energy storage system may also comprise at least one of the thermal energy storage units which may include bypass means for the thermal energy store, and wherein said bypass means is independently selected from one or more diverter valves, one or more system valves, or one or more solenoid valves.

The thermal energy storage system may also comprise at least two thermal energy storage units comprising a heat exchanger with one coil surrounded by a suitable phase change material, and wherein each of said two or more units may comprise the same or different phase change materials, and wherein said phase change materials may be independently selected from formulations containing: one or more waxes; paraffin; one or more fatty acids or salt hydrates thereof; one or more organic-organic eutectic compounds, one or more organic-inorganic eutectic compounds; one or more inorganic-inorganic eutectic compounds; or one or more hygroscopic materials; or any combination thereof.

The thermal energy storage system may also comprise one coil within the at least one further thermal energy storage unit, the primary coil, may be dedicated for use with refrigerant fluids and is suitably adapted for inter-connection to both a condenser and a pressure-lowering device for use with a heat transfer system.

The thermal energy storage system may also comprise one or more coils within the at least one further thermal energy storage unit, the secondary coils, which may be dedicated for use with heat transfer fluids and wherein said secondary coils are adapted to exchange heat with the phase change material in each thermal storage unit.

The secondary coil, or coils, may be suitable for connection to further de-frosting or heat storage services within a heat transfer system.

The heat transfer fluid may be water, water-glycol mixtures and/or refrigerant.

The architecture of the phase change material thermal store, the structure of the thermal energy storage unit is substantially as shown in and as described in relation to FIG. 6.

The architecture of the phase change material thermal store, the structure of the thermal energy storage unit may be substantially as shown in and as described in relation to FIG. 7.

The heat transfer system may additionally comprise one or more compressors, one or more evaporators, one or more pressure-lowering devices and one or more condensers and wherein said components are interconnected to one another and/or the one or more thermal energy storage units.

The one or more thermal energy storage units may be located within the heat transfer system.

The one or more thermal energy storage units may be located outside of the heat transfer system and are linked to the system by suitable connecting means.

Said connecting means may be a suitable refrigerant connection such as for example one or more pipes.

The pressure lowering means may be an expansion valve.

The one or more thermal energy storage units may be connected to components within the heat transfer system at a position between at least one condenser and at least one pressure lowering means and wherein suitable connection means are provided to/from said condenser and said pressure lowering means to the one or more thermal energy storage units.

The system may be independently selected from: a vapour compression system; a reverse-cycle defrosting vapour compression system; a vapour compression refrigeration system; a reverse-cycle defrosting vapour compression refrigeration system; or a heat pump system.

The system may be a reverse-cycle vapour compression refrigeration system wherein the one or more thermal energy storage units may be located externally to and in connection with an internal unit comprising one or more compressors, one or more evaporators, one or more pressure-lowering devices and one or more condensers by means of a suitable refrigerant connection, and wherein the heat transfer system additionally comprises bypass means for the one or more compressors.

The system may be a reverse-cycle vapour compression refrigeration system wherein the one or more thermal storage units and the one or more compressors may be located externally to and in connection with an internal unit comprising one or more evaporators, one or more pressure-lowering devices and one or more condensers by means of a suitable refrigerant connection, and wherein the heat transfer system additionally comprises bypass means for the one or more compressors.

Said bypass means may comprise a diverter valve, a system of solenoid valves, or a combination thereof.

The thermal energy storage system may provides means for the detection and management of frosting conditions.

The detection means may be provided by a plurality of sensors for the measurement of temperature, pressure, and power at points within said system.

The means for the management of frosting conditions may be a combination of a 4-way reversing valve (5) which is located between the compressor and the condenser, and condenser diverting means (7), wherein the reversing valve is adapted to stop the flow of fluid/vapour from the one or more compressors (1) to the one or more condensers (2), wherein the diverting means bypasses the one or more condensers (2) from the flow of fluid/vapour within the system, and wherein the cycle is reversed to provide vapour to the one or more evaporators (4) from the one or more compressors (1) and thereafter to the one or more pressure-lowering devices (3) and then to one or more thermal energy storage units (6), and wherein this reverse-cycle is repeated as required.

According to further aspects there may be additionally provided a heat transfer system including a thermal energy storage system in accordance in accordance with the first aspect, or any other aspects of thermal energy storage systems as detailed herein, wherein the architecture of said heat transfer systems are independently and substantially as shown in and as described in relation to any one of FIGS. 3 to 8.

According to a yet further aspect there may be provided thermal energy storage units in a refrigeration process in a heat transfer system comprising one or more compressors, one or more evaporators, one or more pressure-lowering devices and one or more condensers and wherein said compressors, evaporators, pressure-lowering devices, and condensers are interconnected to one another and/or the one or more thermal energy storage units, and wherein said refrigeration process comprises:
 (i) provision of a suitable refrigerant fluid or working fluid to a heat transfer system;
 (ii) pressurising and heating the fluid under suitable conditions of pressure and temperature to vaporize the fluid in one or more compressors;
 (iii) providing the so-formed pressurised vapour at elevated temperature into one or more condensers via suitable means;
 (iv) cooling the vapour to provide a pressurized or pressurized liquid/vapour mixture at a reduced temperature;
 (v) provision of the liquid or liquid/vapour mixture into the one or more thermal storage units;
 (vi) reducing the temperature via thermal energy exchange means within the thermal storage units; provision of the liquid or liquid/vapour mixture into one or more pressure lowering devices;
 (vii) provision of the reduced-temperature and reduced pressure liquid or liquid/vapour mixture to one or more evaporators;
 (viii) re-heating the liquid or liquid/vapour mixture to provide a vapour; providing the resultant re-evaporate to the one or more compressors.

These and further aspects of the present invention are detailed hereinafter.

BRIEF DESCRIPTION OF THE DRAWINGS

Embodiments of the present invention will now be described, by way of example only, with reference to the following figures:

FIG. 1 is vapour compression refrigeration cycle as found in the prior art:

FIG. 2 illustrates typical system architecture/flow-diagram for a reverse-cycle defrosting cycle of the art;

FIG. 3 illustrates the system architecture/flow-diagram for a heat transfer system of the present invention, including the thermal energy storage unit as defined herein, and use of said system in "normal operating conditions" of a reverse-cycle defrosting cycle in a vapour compression refrigeration system;

FIG. 4 illustrates the system architecture/flow-diagram for a heat transfer system of the present invention, including the thermal energy storage unit as defined herein, and use of said system in "frosting conditions" of a reverse-cycle defrosting cycle in a vapour compression refrigeration system;

FIG. 5 illustrates the system architecture/flow-diagram for a heat transfer system of the present invention, including the thermal energy storage unit as defined herein, and use of said system to effect reverse-cycle defrosting in a vapour compression refrigeration cycle having means for bypassing of the thermal store;

FIG. 6 illustrates the system architecture/flow-diagram for a phase change material containing thermal store having bypass means and suitable for use in a heat transfer system of the present invention;

FIG. 7 illustrates the system architecture/flow-diagram for an alternative phase change material containing thermal store to that provided in FIG. 6. The thermal store in FIG. 7 includes bypass means and is suitable for use in a heat transfer system of the present invention and FIG. 8 illustrates the system architecture/flow-diagram for a heat transfer system according to an alternative embodiment of the present invention, including the thermal energy storage unit as defined herein, and use of said system in "normal operating conditions" of a defrosting cycle in a non-reverse cycle vapour compression refrigeration system.

DESCRIPTION OF THE INVENTION

Figure 9:
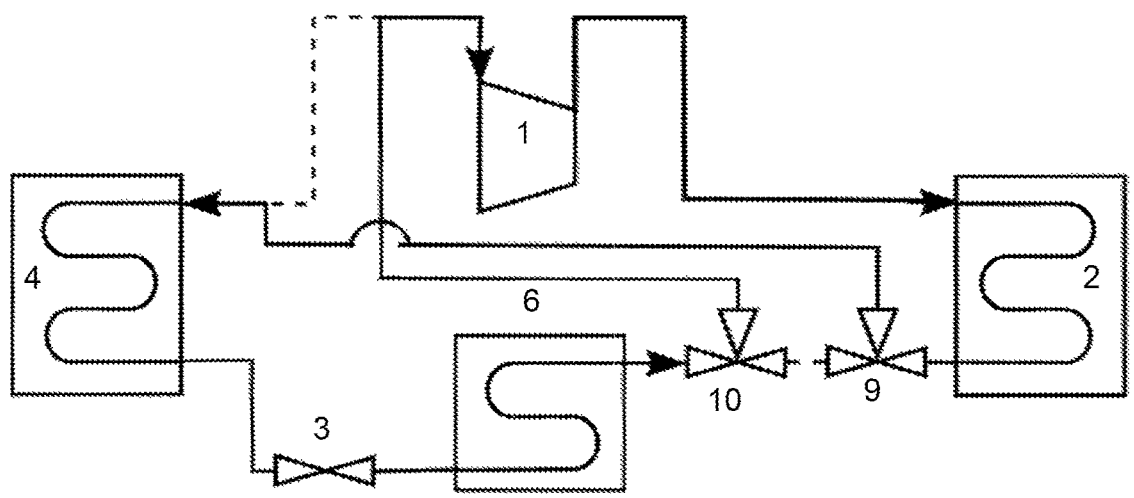

The present invention relates to thermal energy storage systems suitable for use with systems adapted to transfer heat from at least one heat source to at least one heat sink (heat transfer system), comprising at least one thermal energy storage unit.

Heat transfer systems that can employ the thermal energy storage systems detailed herein are: vapour compression systems; reverse-cycle defrosting vapour compression systems; vapour compression refrigeration systems; reverse-cycle defrosting vapour compression refrigeration systems; and/or heat pump systems.

The present invention describes a heat pump or any vapour compression refrigeration systems including one or multiple thermal storage units dedicated to the defrosting cycle in addition to the common components always present in these systems: one or multiple compressors, one or multiple evaporators, one or multiple pressure-lowering devices, and one or multiple condensers.

The present invention also relates to thermal energy storage systems suitable for use with heat pump or any vapour compression refrigeration systems which include one or more thermal storage units dedicated to the defrosting cycle, in addition to heat pump or vapour compression refrigeration systems components including: one or multiple compressors, one or more evaporators; one or more pressure-lowering devices; and one or more condensers.

For the avoidance of doubt, the component parts identified in the thermal energy storage systems herein including: thermal storage units; compressors; evaporators; pressure-lowering devices; and condensers are connected to one another via suitable additional components which are typically present in thermal energy storage systems to enable the flow of the refrigerant, and include such further additional components which are typically present in thermal energy storage systems to enable the measurement of values (temperature/pressure etc.) as may be required at points within the system. For the sake of clarity, such other component parts include, but are not limited to: valves; sensors; pipes; liquid accumulators; and/or filters. Whilst, these are not explicitly detailed hereinafter the nature, need for and location of such additional component parts (where required) are considered to be within the ordinary knowledge of the skilled system engineer. As will be appreciated where systems architectures are illustrated, and systems are discussed, whilst such additional component parts are not listed, where they are required to join one-or-more key components together, or to effect a necessary function, their presence is inherent. The choice and selection of such additional component parts are considered to be within the ordinary knowledge of the skilled system engineer.

For sake of clarity, all the other components that are usually in a real system to make it work, e.g. valves, sensors, pipes, liquid accumulators, filters, are not explicitly mentioned but are always assumed to be there. For supporting reverse-cycle defrosting applications, this invention defines as the most indicated position for the thermal storage that between the condenser and the expansion valve, see component 6 in FIG. 3. In this invention, the thermal storage is not part of the internal unit comprising the condenser in a typical architecture of the vapour compression refrigeration system, but it is connected to it through a refrigerant connection, e.g. a pipe. Being disconnected by the internal unit of the vapour compression refrigeration system, the condenser (2) can be completely bypassed through a system of solenoid valves, or a diverter valve, or any other kind of system apt to achieve this bypass. This allows to run the defrosting taking energy from the thermal storage (6) only, without affecting the energy previously accumulated into the final sink through the condenser into the internal unit.

As previously indicated, the Applicant has developed a novel thermal energy storage system that is particularly suited for use in supporting reverse-cycle defrosting applications. For the avoidance of doubt, the present thermal energy storage system is suitable for use with any system adapted to transfer heat from at least one heat source to at least one heat sink (heat transfer systems).

There is provided herein a novel thermal energy storage system suitable for use with systems adapted to transfer heat from at least one heat source to at least one heat sink (heat transfer system) wherein said thermal energy storage system comprises at least one thermal energy storage unit, wherein said at least one thermal energy storage unit comprises a thermal store comprising a heat exchanger with at least one coil, wherein said at least one coil is surrounded by a suitable phase change material, and wherein said thermal energy storage unit(s) includes means for connection to one-another, and/or to one or more components of a heat transfer system.

For the avoidance of doubt, a thermal energy storage unit, also called a thermal energy store, or thermal storage herein, means storage unit comprises a thermal store comprising a heat exchanger with at least one coil, wherein said at least one coil is surrounded by a suitable phase change material, and wherein said thermal energy storage unit(s) includes means for connection to one-another, and/or to one or more components of a heat transfer system.

The Applicant has found that the present system overcomes the issues associated with frosting conditions in the vapour compression cycle, and reverse-cycle defrosting systems of the art.

In particular, and as illustrated in FIG. 3, the Applicant has developed a novel heat transfer system including at least one thermal energy storage unit (6), wherein the at least one thermal energy storage unit (6) is, positioned between the condenser (2) and the expansion valve.

Importantly, for use in applications subject to frosting conditions such as in vapour compression refrigeration systems the present thermal storage system does not comprise part of the internal unit comprising the compressor, condenser, pressure lowering means and evaporator in the system architecture. In contrast to the systems of the art, in the present system, the one or more thermal energy storage unit(s) is connected to the refrigeration system via suitable refrigerant connection means, such as for example a pipe, or any other suitable connector, as illustrated in FIG. 3 and as discussed hereinafter.

Thus there is also provided herein, a novel heat transfer system including at least one thermal energy storage unit (6), as defined hereinbefore, wherein the heat transfer system additionally comprises one or more compressors, one or more evaporators, one or more pressure-lowering devices and one or more condensers and wherein said components are interconnected to one another and/or the one or more thermal energy storage units, and wherein the at least one thermal energy storage unit (6) is positioned between a condenser (2) and an expansion valve of the heat transfer system, and wherein thermal storage system does not comprise part of the internal unit in the system architecture. Advantageously, in the present heat transfer systems, as defined hereinbefore, the condenser (2) is dis-connected from the internal portion of the vapour compression refrigeration system and can be completely bypassed through a system of solenoid valves, or a diverter valve, or any other kind of system apt to achieve this bypass. The Applicant has found that this condenser-bypass set-up, provides for effective heat transfer, and in particular enables the defrosting process to run whilst only taking heat (energy) from the thermal storage (6), without impacting upon the accumulated heat (energy) which has been transferred into the final heat sink through the condenser into the internal unit (of the vapour compression refrigeration system).

Thus, the present invention additionally provides a novel heat transfer system including at least one thermal energy storage unit (6), as defined hereinbefore, wherein the heat transfer system additionally comprises one or more compressors, one or more evaporators, one or more pressure-lowering devices and one or more condensers and wherein said components are interconnected to one another and/or the one or more thermal energy storage units, and wherein the at least one thermal energy storage unit (6) is positioned between a condenser (2) and an expansion valve of the heat transfer system, and wherein the thermal storage system and the one or more condensers do not comprise part of the internal unit comprising the condenser in the system architecture.

In heat transfer systems according to the invention, and as defined herein, and independent of whether the condenser is bypassed in the system or not, during normal operation, the liquid or mixture of liquid and vapour leaving the condenser (2) retains sensible and/or latent levels of heat. This retained heat energy is typically lost or wasted in currently available heat transfer systems.

The terms "latent" heat and "sensible" heat are defined herein, essentially sensible heat can be sensed by measuring the temperature. When melting a solid matter, sensible heat is the thermal energy released with a change in temperature, and latent heat is the thermal energy released with negligible change in temperature. For example, when melting a block of ice from −5° C. to 20° C., the energy released between −5° C. and 0° C. from the solid block as well as the energy released from 0° C. to 20° C. in liquid state is the sensible heat. The remaining energy, released at 0° C. during the melting phase, is latent energy.

Advantageously, the present heat transfer systems, in addition to providing more efficient means for delivery of desirable defrosting, also provides means for recovery of such retained heat energy i.e. in material leaving the condenser (2) in at least one dedicated thermal energy heat storage unit (6), before being expanded and further cooled in the pressure-lowering device (3).

Where the present heat transfer system is used to for the provision of reverse-cycle defrosting in a vapour compression refrigeration cycle, as illustrated in FIG. 3, then during normal operation of the system a working fluid, typically a refrigerant, is pressurised to its vapour state by a compressor (1). This high-temperature and high-pressure vapour is then cooled in a condenser (2) where it releases heat and condenses into a mild-temperature and high-pressure liquid or mixture of liquid and vapour. This liquid or mixture of liquid and vapour enters the thermal storage (6) where it exchanges thermal energy with it, thereby further lowering its temperature. This liquid or mixture of liquid and vapour then enters a pressure-lowering device (3) to become a low-temperature liquid or mixture of low-temperature/low-pressure vapour and liquid. As a final step, it enters the evaporator (4) where it is heated up and is evaporated before being returned to the compressor.

The terms "normal operation" and "operation during frosting conditions" as used herein, in relation to the novel heat transfer systems provided by the present invention mean, normal heating conditions, and abnormal conditions where in response to a frosting-related trigger, switching and bypass means are effected to deliver de-frosting whilst retaining desirable in-system heat storage/heat-related outputs (hot water/radiator heat levels).

A frosting-related trigger as defined herein includes: formation of ice on evaporator coils; detection of temperatures below which frosting is liable to occur via any suitable sensing means.

For the avoidance of doubt, the detection of frosting conditions can be made either by the heat pump, or within the heat storage system. As such, the present invention provides thermal energy storage systems, which additionally include means for the detection of frosting conditions.

Any suitable means for such detection may be used. Suitable means for detection of frosting conditions include means for measuring the temperature of the evaporator, typically means for measurement of the temperature of the external surface of the evaporator. For example, in a thermal energy storage system in accordance with the present invention which includes means for measurement of the temperature of the external surface of the evaporator whereby when the measured temperature reaches 0° C. the defrosting cycle starts. When that temperature goes back to about 10-15° C., the defrosting cycle stops and the normal operation starts again.

In an alternative method suitable for use in the present thermal energy systems, means for measuring the temperature of the evaporator enables measurements to be taken for airflow, refrigerant pressure, air or coil temperature and pressure differential across the outdoor coil to detect frost accumulating on the outdoor coil. In this alternative method when the measured temperature reaches 0° C. the defrosting cycle starts. When that temperature goes back to about 10-15° C., the defrosting cycle stops and the normal operation starts again.

For the avoidance of doubt, any suitable means for measurement of the temperature of the external surface of the evaporator may be utilised, and/or any suitable means for measurement of the airflow, refrigerant pressure, air or coil temperature and pressure differential across the outdoor coil may be utilised in the thermal energy systems herein.

In normal operation, the liquid or mixture of liquid and vapour leaving the condenser (2) still have sensible and/or latent heat left that is usually wasted. In this invention, this is recovered in a dedicated storage (6), before being expanded and further cooled in the pressure-lowering device (3). Therefore, this invention includes the following refrigerant cycle during normal operation of the system: a working fluid, typically a refrigerant, is pressurised to its vapour state by a compressor (1); the high-temperature and high-pressure vapour is then cooled in a condenser (2) where it releases heat and condenses into a mild-temperature and high-pressure liquid or mixture of liquid and vapour; this liquid or mixture of liquid and vapour enters the thermal storage (6) where it exchanges thermal energy with it, further lowering its temperature; this liquid or mixture of liquid and vapour then enters a pressure-lowering device (3) to become a low-temperature and low-pressure liquid or mixture of vapour and liquid; as a final step, it enters the evaporator (4) where it is heated up and evaporates again before returning to the compressor.

When frosting conditions are detected by the vapour compression refrigeration system, the compressor is stopped and the cycle reversed by switching the position of the 4-way reversing valve (5), see FIG. 4; the condenser is bypassed through a system of solenoid valves or diverter valves (7); the compressor (1) starts; high-temperature and high-pressure gas enters the evaporator (4) where heat is released by the hot gas while condensing to melt the ice on the coil; the mild-temperature and high-pressure gas or mixture of gas and liquid is expanded through the pressure-lowering device (3); the low-temperature liquid is then warmed up into the heat storage (6) and its temperature is raised; through the thermal storage, the refrigerant partially or completely evaporates; this mild-temperature and low-temperature gas or mixture of gas and liquid is further heated in the compressor into a high-temperature, high-pressure gas; this gas enters the evaporator to melt the ice and the cycle continue until a safe and efficient normal operation is guaranteed.

In particular, this invention relates to heat transfer systems as detailed herein where the thermal store (6) includes phase change material.

Thus there is provided herein a novel heat transfer system including at least one thermal energy storage unit (6), as defined hereinbefore, wherein the heat transfer system additionally comprises one or more compressors, one or more evaporators, one or more pressure-lowering devices and one or more condensers and wherein said components are interconnected to one another and/or the one or more thermal energy storage units, and wherein the at least one thermal energy storage unit (6) is positioned between a condenser (2) and an expansion valve of the heat transfer system (3), wherein the thermal storage system does not comprise part of the internal unit comprising the condenser in the system architecture, and wherein the at least one thermal energy storage unit (6) includes phase change material.

In these heat transfer systems the thermal store comprises a heat exchanger with at least one coil, where the refrigerant in liquid or gas state flows through the coil, and the coil is surrounded by the phase change material and thereby enhances the heat transfer between the phase change material and the refrigerant. In the present heat transfer systems the Applicant has found that this enhanced heat transfer can be further boosted via the inclusion of suitable heat exchange boosting means within the heat exchanger component of the thermal store. Any suitable heat exchange boosting means can be used including: metal fins; dispersion of graphite in the phase change material (PCM); finned pipes; a subdivision of the pipes into micro-channels.

The Applicant has found that inclusion of a multiplicity of metal fins within the heat exchanger component is especially effective for heat exchange boosting. A heat exchanger including metal fins including a finned pipe can therefore be used in the present invention. As will be readily appreciated the absolute number of metal fins, or the absolute number of fins on a finned pipe will be dependent upon the size of the particular thermal store.

The Applicant has also found that dispersion of graphite in the PCM is valuable for enhancing the thermal conductivity into the heat store.

Thus there is additionally provided herein a thermal energy storage system suitable for use with systems adapted to transfer heat from at least one heat source to at least one heat sink (heat transfer system), wherein said thermal energy storage system comprises at least one thermal energy storage unit, wherein said at least one thermal energy storage unit comprises a thermal store comprising a heat exchanger with at least one coil, wherein said at least one coil is surrounded by a suitable phase change material, and wherein said thermal energy storage unit(s) includes means for connection to one-another, and/or to one or more components of a heat transfer system, and wherein the at least one thermal energy storage unit additionally includes a multiplicity of internal metal fins co-located with the one or more coils of the heat exchanger.

Suitable phase change materials for use in the thermal energy storage systems herein are: any formulation containing a wax, or paraffin, or a fatty acid, or a salt hydrate, or an organic-organic, organic-inorganic, inorganic-inorganic eutectic compound, or a hygroscopic material, or any combination of these.

Thus there is additionally provided herein a thermal energy storage system suitable for use with systems adapted to transfer heat from at least one heat source to at least one heat sink (heat transfer system), wherein said thermal energy storage system comprises at least one thermal energy storage unit, wherein said at least one thermal energy storage unit comprises a thermal store comprising a heat exchanger with at least one coil, wherein said at least one coil is surrounded by a suitable phase change material, and wherein said thermal energy storage unit(s) includes means for connection to one-another, and/or to one or more components of a heat transfer system, and wherein the at least one thermal energy storage units includes a multiplicity of internal metal fins co-located with the one or more coils of the heat exchanger and/or a phase change material which is independently selected from formulations containing: one or more waxes; paraffin; one or more fatty acids or salt hydrates thereof; one or more organic-organic eutectic compounds, one or more organic-inorganic eutectic compounds; one or more inorganic-inorganic eutectic compounds; or one or more hygroscopic materials; or any combination thereof.

The Applicant has found that the use of phase change materials provides advantages versus the use of alternative thermal storage media e.g. water or rocks. In particular, use of phase change materials enables the absorption and release of heat for longer times and within a pre-defined temperature range. This feature enables the provision of a tailored thermal energy storage system in accordance with the desired performance and installation requirements for the particular application using specified phase change materials.

Furthermore, a particular advantage of the present system design where the thermal store is not integrated into the internal unit containing the condenser (2), is that the thermal store can be easily changed in accordance with the anticipated performance and installation requirements, and can be easily serviced, replaced, or upgraded without any interruption of the normal operation of the vapour compression refrigeration cycle.

Another advantage of using non-integrated thermal storage as defined herein is that the thermal storage can be installed into the heat transfer system at any suitable point between the internal unit containing the condenser (2) and the pressure-lowering device (3).

In particular, this invention relates to the use of phase change material in the thermal store (6), where the thermal store is composed by a heat exchanger with at least one coil, where the refrigerant in liquid or gas state flows through the coil, and the coil is surrounded by the phase change material and enhance the heat transfer between the phase change material and the refrigerant, e.g. through metal fins. The phase change material can be any formulation containing a wax, or a paraffin, or a fatty acid, or a salt hydrate, or an organic-organic, organic-inorganic, inorganic-inorganic eutectic compound, or a hygroscopic material, or any combination of these. The advantage of phase change material over other thermal storage media e.g. water or rocks is that it can absorb and release heat for long times in a defined temperature range. Therefore, the phase change material can be tailored to the system according to the expected performance and installation requirements.

For example, when heat pumping is used for hot water preparation, a phase change material with a phase change temperature of 34° C. and/or 28° C. but not limited to these can be used; when heat pumping is used for underfloor space heating, a phase change material with a phase change temperature of 28° C. and or 12° C. but not limited to these can be used. Furthermore, the advantage of a thermal store that is not integrated in the internal unit containing the condenser (2) is that the thermal store can be easily changed depending on the expected performance and installation requirements, and can be easily serviced or changed or upgraded without any interruption of the normal operation of the vapour compression refrigeration cycle. Another advantage is that the thermal store can be installed everywhere between the internal unit containing the condenser (2) and the pressure-lowering device (3). This invention refers to any system where ice or frost can build up on the evaporator (4), for example when this evaporator (4) is exposed to external ambient conditions, or when this evaporator (4) is in a closed environment, e.g. a refrigerator, a freezer, a refrigerated vehicle, a climate chamber. This invention relates also to any other components in a heat pumping system apart from the evaporator where ice or frost can build up, e.g. pipes, additional heat exchangers where other fluids can change phase or are circulating at temperatures below frosting or freezing conditions, and require therefore defrosting. This for example can be a system used to a freezer/refrigerator, stationary or mobile, composed by different heat exchangers, where in one or more liquid nitrogen from a tank flows and evaporates, and where in another or other heat exchangers with multiple pipes, in some of which refrigerant from a heat pump system evaporates, and in some others the another heat transfer fluid that flowed in the first heat exchanger(s) flows to enhance the evaporation. In both cases, frost or ice can form and the proposed invention can therefore be applied there.

In a different embodiment of the invention, see FIGS. 5 and 6, the connection between the internal unit and the thermal storage can also comprise one or multiple solenoid valves or diverter valves (8) or any other kind of system to bypass the thermal storage depending on the operating conditions of the whole system. This has the advantage over the previous architecture that in period or operating conditions when no frosting conditions are possible, the storage can be bypassed saving the energy necessary to load heat into it and the energy that would be wasted by the thermal store that is not used.

In a further embodiment of the invention, as illustrated in FIG. 5, and as discussed hereinafter, the connection between the internal unit and the thermal storage can additionally comprise one or more thermal storage-specific solenoid valves or diverter valves (8), or any other kind of system, to bypass the thermal storage depending on the operating conditions of the whole system. This thermal storage bypass provides an in-built energy-saving/process efficiency feature for the present heat transfer systems, as well as providing further system design flexibility. In particular, during periods or operating conditions where no frosting conditions are possible, such as for example when the ambient temperature and relative humidity surrounding the evaporator is above freezing conditions, or when the evaporator temperature is higher than temperature required to freeze the surrounding air, the thermal storage can be bypassed. This bypass saves the energy that would be necessary to load heat into the thermal storage system, and the energy that would be wasted by the thermal store when not in use.

Thus there is provided herein a thermal store comprising a heat exchanger with at least one coil, wherein said at least one coil is surrounded by a suitable phase change material, and wherein said thermal energy storage unit(s) includes means for connection to one-another, and/or to one or more components of a heat transfer system, and wherein the at least one the thermal energy storage units includes a multiplicity of internal metal fins co-located with the one or more coils of the heat exchanger and/or a phase change material which is independently selected from formulations containing: one or more waxes; paraffin; one or more fatty acids or salt hydrates thereof; one or more organic-organic eutectic compounds, one or more organic-inorganic eutectic compounds; one or more inorganic-inorganic eutectic compounds; or one or more hygroscopic materials; or any combination thereof.

In a different embodiment of this invention, see FIG. 7, the thermal store (6) is composed by two or more storage modules $s_1, s_2, \ldots, s_n$, each one containing the same or different phase change materials, and none, one or more diverter valves $d_1, d_2, \ldots, d_n$, or system or solenoid valves or any mean to divert the flow of the refrigerant into the storage module or bypass it. The advantage of this configuration is that the heat storage capacity can be adapted to variable ambient conditions influencing the frosting of the evaporator (4), e.g. in a residential environment where the evaporator is exposed to external conditions in a location with a high thermal excursion over the year.

In a thermal store as defined herein which includes a bypass system of the nature illustrated in FIG. 6 each storage unit contains a coil through which gas or liquid may flow. Each coil is independently connected at one end (the input) to a corresponding diverter valve $d_1, d_2 \ldots d_n$ and at the other end to the thermal store throughput channel. Diverter valves $d_1, d_2 \ldots d_n$ are connected in series and during use gas or liquid can flow through each of the store, none or the stores, or any combination of stores in accordance with the requirements of the user. As will be appreciated, the number of storage units and type of thermal store-specific valve system employed can be varied in accordance with the system requirements, as discussed herein.

An advantage of this multiple-storage unit and variable storage unit bypass configuration is that the heat storage capacity of the system can be adapted to variable ambient conditions influencing the frosting of the evaporator (4), e.g. in a residential environment where the evaporator is exposed to external conditions in a location with a high thermal excursion over the year.

Thus the present invention additionally provides a thermal energy storage system suitable for use in heat transfer systems as defined herein wherein the thermal energy storage system comprises a multiplicity of thermal energy storage units each of which comprises a thermal store comprising a heat exchanger with at least one coil, wherein said at least one coil is surrounded by a suitable phase change material, wherein the thermal energy storage units include means for connection to one-another, and/or to one or more components of a heat transfer system, and wherein the thermal energy storage units includes a multiplicity of internal metal fins co-located with the one or more coils of the heat exchanger and wherein the storage system comprises at least two thermal energy storage units and wherein the phase change materials in each storage units may be the same or different. There is additionally provided herein a thermal energy storage system (thermal store) including a multiplicity of thermal energy storage units, each having a heat exchanger, phase change materials, connection means, and metal fins as detailed hereinbefore, wherein the thermal store comprises at least two thermal energy storage units (storage units), wherein the phase change materials in each storage unit may be the same or different, and wherein the thermal store includes bypass means for each of the storage units within the thermal store, and optionally wherein said bypass means comprises a thermal storage unit-specific valve system.

In particular, the thermal storage-unit specific valve system comprises a plurality of diverter valves, or a plurality of system or solenoid valves, or any other suitable means for diverting the flow of the refrigerant into any specified storage unit within the thermal store or to bypass it.

There is particularly provided a thermal energy storage system according to any aspect or embodiment as defined herein wherein said thermal energy storage system comprises at least two thermal energy storage units.

In another embodiment of this invention, see FIG. 8, the thermal store (6) can be composed by one or more thermal storage units $s_1, s_2, \ldots, s_n$, each one containing the same or different phase change materials, and none, one or more diverter valves $d_1, d_2, \ldots, d_n$, or system or solenoid valves or any mean to divert the flow of the refrigerant into the storage module or bypass it, where one or more of the thermal storage units $s_1, s_2, \ldots, s_n$ can contain two or more coils. The primary coil is dedicated to the refrigerant and is connected to the condenser (2) of the internal unit and to the pressure-lowering device (3). The secondary coil or coils contain a heat transfer fluid, e.g. water or water-glycol mixtures or refrigerant. Furthermore, none, one or more diverter valves $c_1, c_2, \ldots, c_n$, or system or solenoid valves or any mean to divert the flow of the refrigerant into the storage module or bypass it are connected to the secondary coil or coils. The secondary coils can be used to exchange heat with the phase change material into each thermal storage units $s_1, s_2, \ldots, s_n$. The secondary coil can therefore be connected to various services to either support defrosting or to utilise the heat stored in units $s_1, s_2, \ldots, s_n$ for different services.

In this yet further still embodiment one or more of the thermal storage units $s_1, s_2, \ldots, s_n$ may contain two or more coils. In a storage unit containing two or more coils, one coil, the so-called primary coil, is dedicated to the refrigerant. At one end the primary coil, or system or primary coils for a series of thermal storage units, is in fluid connection, via an optional thermal store-specific diverter valve system as defined hereinbefore, with the condenser (2) of the internal unit of the heat transfer system of a heat transfer system in accordance with the present invention as defined herein. At the other end, the primary coil, or system or primary coils for a series of thermal storage units, is in fluid connection, via an optional thermal store-specific diverter valve system as defined hereinbefore, with the pressure-lowering device (3) of the internal unit of a heat transfer system in accordance with the present invention. As will be appreciated, either end of the storage units may function as inputs or outputs depending upon whether the heat transfer system in which the one or more storage units are employed is operating under normal or in reverse-cycle conditions.

In systems containing two or more coils, the second, so-called secondary coil or coils each contain a heat transfer fluid. Where two or more secondary coils are present, and they are connected together in series, such as the arrangement illustrated in FIG. 7 they must contain the same heat transfer fluid. Suitable heat transfer fluids for use in the secondary coil system herein include but are not limited to: water; water-glycol mixtures; or a refrigerant.

For the avoidance of doubt, none of the secondary coils are in fluid connection with the refrigerant, which is passed through the primary coil system. In systems employing a multiplicity of secondary coils, each of the secondary coils can be switched on or off via a dedicated secondary coil-specific valve system, as illustrated by diverter valves $c_1$, $c_2$, . . . , $c_n$, in FIG. 7. The secondary coil-specific valve system may comprise one or more diverter valves, or system or solenoid valves or any other suitable means to divert the flow of the heat transfer fluid through the secondary coils of the storage unit.

Fluid connection as defined herein means a connections where liquid, vapour, or a mixture of liquid and vapour is flowing from one component to the adjacent component within the system.

Advantageously, this secondary coil system can be used to exchange heat with the phase change material in each of the thermal storage units $s_1$, $s_2$, . . . , $s_n$ within the thermal store. The secondary coil system can be connected to various services to either support defrosting or to utilise the heat stored in units $s_1$, $s_2$, . . . , $s_n$ for different services.

Thus there is additionally provided a thermal energy storage system comprising at least two thermal energy storage units, wherein at least one thermal energy storage unit comprises a thermal store comprising a heat exchanger with one coil, wherein said one coil is surrounded by a suitable phase change material, and wherein at least one further thermal energy storage unit comprises a thermal store comprising a heat exchanger which comprises two or more coils, and wherein each of said thermal energy storage units may optionally and independently include bypass means for the thermal energy store.

There particularly provided herein a thermal energy storage system (thermal store) including a multiplicity of thermal energy storage units, each having a heat exchanger, phase change materials, connection means, and metal fins as detailed hereinbefore, wherein the thermal store comprises at least two thermal energy storage units (storage units), wherein the phase change materials in each storage unit may be the same or different, wherein the thermal store includes bypass means for each of the storage units within the thermal store, wherein at least one of the thermal energy storage units includes two coils, wherein the primary coil is connected to the refrigerant system and wherein the secondary coil contains a heat transfer material, and optionally and independently includes bypass means for the primary and/or secondary coil systems.

In another embodiment there is provided herein a heat transfer system wherein the novel phase change material-based thermal storage systems in accordance with the invention and as described hereinbefore are used for defrosting an evaporator in a heat transfer system without reversing the cycle and without stopping the delivery of heat to the condenser. This embodiment is illustrated in FIG. 8.

In FIG. 8, there is no 4-way valve because the cycle is not reversed. Similarly, the bypass arrangements for the condenser (2), as illustrated in FIGS. 3 and 4, are also unnecessary in this embodiment because the provision of heat into the condenser (2) is not interrupted during defrosting cycles. During the normal operation of a vapour compression cycle this system works in the same manner as described hereinbefore with a working fluid, typically a refrigerant, being pressurised to a high-temperature and high-pressure vapour state by a compressor (1). The high-temperature and high-pressure vapour is then cooled in a condenser (2) where it releases heat and condenses into a mild-temperature and high-pressure liquid or mixture of liquid and vapour. This liquid or mixture of liquid and vapour enters the thermal storage (6) where it exchanges thermal energy with the thermal store to lower the temperature of the liquid or mixture yet further. This liquid or mixture of liquid and vapour then enters a pressure-lowering device (3) to become a low-temperature and low-pressure liquid or mixture of vapour and liquid. As a final step, it enters the evaporator (4) where it is heated up and evaporated before returning to the compressor (1).

For the avoidance of doubt, the novel thermal energy storage systems as detailed hereinbefore are suitable for use in the above embodiment of a heat transfer system in which neither the cycle is reversed, nor the heat to the condenser is stopped. Thus there is also provided herein a novel heat transfer system including one or more thermal energy storage units, as detailed hereinbefore, suitable for use for defrosting an evaporator in a heat transfer system without reversing the cycle and without stopping the delivery of heat to the condenser wherein the heat transfer system comprises one or more compressors, one or more evaporators, one or more pressure-lowering devices and one or more condensers and wherein said components are interconnected to one another and/or the one or more thermal energy storage units, and wherein a plural valve system is employed to divert the flow of the refrigerant at two different points, and to two different components within the system.

When frosting conditions are detected by the vapour compression refrigeration system a plural valve system is employed to divert the flow of the refrigerant at two different points, and to two different components within the system. An exemplary system employing a plural valve system (9), (10) is illustrated in FIG. 9. Valve systems (9) and (10) can be a series of diverter valves, or a system of solenoid valves or any other suitable means for altering the flow of refrigerant as desired. During use the compressor (1) delivers a high-temperature and high-pressure gas to the condenser (2) where heat is released by the hot gas while condensing. The resultant the mild-temperature and high-pressure gas is diverted by the valve system (9) to the evaporator (4) to melt, or partially melt the ice formed on it. On exit from the evaporator this low-temperature and high-pressure liquid, or mixture of liquid and vapour, is then expanded through the pressure-lowering device (3) to form a low-temperature and low-pressure liquid, or mixture of liquid and vapour. This mixture is then transferred into the heat storage (6) where it is warmed up to raise its temperature during transfer through the thermal storage, during this stage the refrigerant partially or completely evaporates. On exit from the heat storage (6) the mild-temperature and low-temperature gas or mixture of gas and liquid is diverted by the valve system (10) into the compressor (1) to restart the cycle until conditions for safe and efficient normal operations are guaranteed.

DESCRIPTION OF FIGURES

FIG. 1: illustrates typical system architecture/flow-diagram for a vapour compression refrigeration cycle of the art. In FIG. 1 are shown a compressor (1), a condenser (2); a pressure-lowering device (3); and an evaporator (4). In use, a working fluid, typically a refrigerant, is pressurised to a high-temperature and high-pressure vapour state by compressor (1); as indicated by the arrow direction, the hot and pressurised vapour is then cooled in condenser (2) where it releases heat and condenses into a mild-temperature and high-pressure liquid or mixture of liquid and vapour; as indicated by the arrow direction, this liquid or mixture of liquid and vapour then enters pressure-lowering device (3) where it becomes a low-temperature liquid (or mixture of vapour and liquid); as a final step, and again as indicated by the arrow direction, this low-temperature (or vapour/liquid mixture) then enters the evaporator (4) where it is heated up and evaporates again before returning to the compressor (1), for re-use as necessary.

FIG. 2: illustrates typical system architecture/flow-diagram for a reverse-cycle defrosting cycle of the art. In FIG. 2 are shown a compressor (1), a condenser (2); a pressure-lowering device (3); an evaporator (4); and a 4-way reversing valve (5). In use, refrigerant, is pressurised by compressor (1); as indicated by the arrow direction, this hot pressurised vapour is then cooled in evaporator (4), which at one-and-the-same time melts any ice which has formed; as indicated by the arrow direction, this pressurised, temperature lowered liquid enters pressure-lowering device (3) where it is successively expanded, prior to entry to condenser (2) where it is heated-up to become a high temperature vapour, and as indicated by the arrow direction, is transferred into the compressor (1) for re-use.

For the avoidance of doubt, in FIG. 2, whilst in use in reverse-cycle defrosting, evaporator (4) acts as a condenser, and the condenser (2) acts as an evaporator.

FIG. 3: illustrates the system architecture/flow-diagram for a heat transfer system of the present invention, including the thermal energy storage unit as defined herein, and use of said system in "normal operating conditions" of a reverse-cycle defrosting cycle in a vapour compression refrigeration system. In FIG. 3 are shown a compressor (1), a condenser (2); a pressure-lowering device (3); an evaporator (4); a 4-way reversing valve (5); a thermal storage unit (6) intermediate between pressure lowering device (3) and valve-system (7). During normal use, the working fluid, typically a suitable refrigerant is pressurised into a vapour in compressor (1), as indicated by the arrow direction, this hot pressurised vapour is then cooled in condenser (2), where it releases heat and condenses into a mild-temperature and high-pressure liquid or mixture of liquid and vapour; as indicated by the arrow direction, this liquid or mixture of liquid and vapour then enters the thermal storage system (6) where the liquid or liquid/vapour mixture exchanges thermal energy with the thermal store, as indicated by the arrow direction, the resultant lower yet milder-still temperature liquid or liquid/vapour mixture then enters a pressure-lowering device (3) for treatment to become a low-temperature and low-pressure liquid or mixture of vapour and liquid, as a final step, and again as indicated by the arrow direction, this low-temperature and low pressure (or vapour/liquid mixture) then enters the evaporator (4) where it is heated up and evaporates again before returning to the compressor (1), for re-use as necessary.

FIG. 4: illustrates the system architecture/flow-diagram for a heat transfer system of the present invention, including the thermal energy storage unit as defined herein, and use of said system in "frosting conditions" of a reverse-cycle defrosting cycle in a vapour compression refrigeration system. The components in FIG. 4, (1), (2), (3), (4), (5), (6), and (7) are as defined in FIG. 3.

Under frosting conditions, or when frosting conditions are detected, a two-stage process is employed: Firstly compressor (1) is stopped and the cycle reversed by switching the position of the 4-way reversing valve (5), condenser (2) is bypassed by valve system (7); Once the bypass set-up has been the effected, compressor (1) re-starts and high-temperature and high-pressure gas from the compressor is channelled to the evaporator (4) where the hot gas condenses on the coil, to become a lower-temperature gas or mixture of gas and liquid and at one and the same time melt the ice on the coil; following exit from the evaporator the lower-temperature and high-pressure gas or mixture of gas and liquid is expanded through the pressure-lowering device (3); this low-temperature/pressure-lowered liquid or mixture of gas and liquid is then transferred into the heat storage unit (6) where its temperature is raised; through the thermal storage, the refrigerant partially or completely evaporates; this mild-temperature and low-temperature gas or mixture of gas and liquid is then further heated in the compressor (2) into a high-temperature, high-pressure gas; this gas is then channelled to the evaporator via the 4-way reversing valve and enters the evaporator to continue melting the ice and this reverse-cycle is repeated until conditions for a safe and efficient normal operation are guaranteed.

FIG. 5: illustrates the system architecture/flow-diagram for a heat transfer system of the present invention, including the thermal energy storage unit as defined herein, and use of said system to effect reverse-cycle defrosting in a vapour compression refrigeration cycle having means for bypassing of the thermal store. The components in FIG. 5, (1), (2), (3), (4), (5), (6), and (7) are as defined in FIG. 3. In FIG. 5 is additionally illustrated a further thermal store-specific valve system (8) located between the existing condenser-specific valve system (7) and the thermal store (6). During normal operating conditions, or pre-determined periods in accordance with the particular application in which the heat transfer system is to be used, the thermal store-specific valve system (8) can be engaged to bypass the thermal store (6) during heat transfer.

FIG. 6: illustrates the system architecture/flow-diagram for a phase change material containing thermal store having bypass means and suitable for use in a heat transfer system of the present invention. In FIG. 6 are shown a Thermal Store (6) in which there are a number of storage units, labelled as $s_1, s_2 \ldots s_n$. Each storage unit contains phase change material (not shown), which may be the same or different. Each storage unit contains a coil through which gas or liquid may flow, and each coil is independently connected at one end (the input) to a corresponding diverter valve $d_1, d_2 \ldots d_n$ and at the other end to the thermal store throughput channel. Diverter valves $d_1, d_2 \ldots d_n$ are connected in series and during use gas or liquid can flow through each of the store, none of the stores, or any combination of stores in accordance with the requirements of the user. For the avoidance of doubt the input and output for the store are connected to a heat transfer system as detailed herein, such as are illustrated in FIG. 3, 4 or 5 herein.

FIG. 7: illustrates the system architecture/flow-diagram for an alternative phase change material containing thermal store to that provided in FIG. 6. The thermal store in FIG. 7 includes bypass means and is suitable for use in a heat transfer system of the present invention. In FIG. 7 are shown a Thermal Store (6) in which there are a number of storage units, labelled as $s_1, s_2 \ldots s_n$.

Each storage unit contains a phase change material (not shown) and a primary coil through which gas or liquid may flow, and each primary coil is independently connected at one end (the input) to a corresponding diverter valve $d_1$, $d_2 \ldots d_n$ and at the other end to the thermal store throughput channel. Diverter valves $d_1, d_2 \ldots d_n$ are connected in series and during use gas or liquid can flow through each store, none of the stores, or any combination of stores in accordance with the requirements of the user. For the avoidance of doubt the system input and system output for the primary coil system of the store are connected to a heat transfer system as detailed herein, such as are illustrated in FIG. 3, 4 or 5 herein.

Each storage unit also contains a secondary coil through which a heat transfer fluid may flow, and each secondary coil is independently connected at one end (the input) to a corresponding secondary coil-specific diverter valve $c_1$, $c_2 \ldots c_n$ and at the other end to the secondary coil throughput channel. Secondary coil-specific diverter valves $c_1, c_2 \ldots c_n$ are connected in series and during use a common heat transfer fluid can flow through each secondary coil, none of the coils, or any combination of the coils in accordance with the requirements of the user. For the avoidance of doubt the system input and system output for the secondary coil system of the store are connected to such services as are required for the particular application within which the storage system in employed in any given heat transfer system.

FIG. 8: illustrates the system architecture/flow-diagram for a heat transfer system according to an alternative embodiment of the present invention, including the thermal energy storage unit as defined herein, and use of said system in "normal operating conditions" of a defrosting cycle in a non-reverse cycle vapour compression refrigeration system. The following components in FIG. 8, (1), (2), (3), (4), and (6) are as defined in FIG. 3. During normal operation, the refrigerant is processed through the system from the compressor to condenser then to the thermal store followed by the pressure-lowering device followed by the evaporator before returning to the compressor in the same manner as discussed in relation to FIG. 3.

In FIG. 8 are shown valve systems (9) and (10) which are utilised when frosting conditions are detected and which are discussed in relation to FIG. 9. For the avoidance of doubt the dashed lines in FIG. 8 expressly indicate that the refrigerant does not flow through the dashed paths initiating from the valve systems (9) and (10) during normal operations.

FIG. 9: illustrates the system architecture/flow-diagram for a heat transfer system according to the alternative embodiment of the present invention detailed in FIG. 8, including the thermal energy storage unit as defined herein, and use of said system in "frosting operating conditions" of a non-reverse-cycle defrosting cycle within a vapour compression refrigeration system. The following components in FIG. 9, (1), (2), (3), (4), and (6) are as defined in FIG. 3.

When frosting conditions are detected and as indicated by the arrow direction, compressor (1) delivers high-temperature/high-pressure gas to condenser (2), as indicated by the arrow direction the mild-temperature/high-pressure gas is then diverted by the valve system (9) to the evaporator (4) to melt the ice formed on it, as indicated by the arrow direction, the low-temperature/high-pressure liquid (or mixture of liquid and vapour) is then expanded via pressure-lowering device (3), and as indicated by the arrow direction, the low-temperature/low-pressure liquid (or mixture of liquid and vapour) is then warmed up in heat storage (6), as indicated by the arrow direction, the resultant mild-temperature/low-temperature gas (or mixture of gas and liquid) is then diverted by the valve system (10) into the compressor (1) to restart the cycle until conditions for safe and efficient normal operations can be guaranteed.

Figure 10:
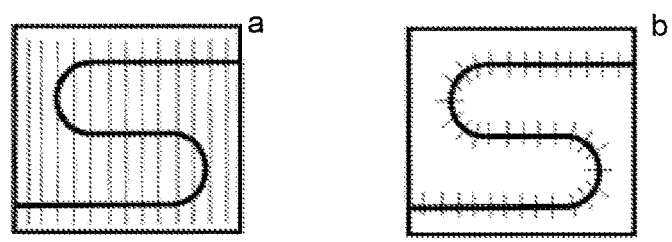

FIG. 10: illustrates two alternative means for enhancing the heat transfer within the present heat transfer systems. At (a) of FIG. 10 a thermal energy storage unit including a multiplicity of internal metal fins co-located with a coil of the heat exchanger. The thermal energy storage unit may additionally include a phase change material (not illustrated) which may contain graphite. At (b) of FIG. 10 a thermal energy storage unit having a multiplicity of metal fins located upon a coil of the heat exchanger is illustrated. The thermal energy storage unit may additionally include a phase change material (not illustrated) which may contain graphite.

The invention claimed is:

1. A thermal energy storage system in the form of a reverse-cycle defrosting vapour compression system suitable for use with systems adapted to transfer heat from at least one heat source to at least one heat sink (heat transfer system), wherein said thermal energy storage system comprises:
   at least two thermal energy storage units
   comprising a thermal store comprising a heat exchanger with phase change material;
   a primary coil of the heat exchanger dedicated for use with refrigerant fluids and adapted for inter-connection to both a condenser and a pressure-lowering device for use with a heat transfer system;
   a secondary coil of the heat exchanger dedicated for use with heat transfer fluids and adapted to exchange heat with the phase change material, wherein said primary coil and secondary coil are surrounded by the phase change material;
   one or more evaporators, wherein said at least two thermal energy storage units include means for connection to one-another, and/or to one or more components of a heat transfer system; and
   at least one of the at least two thermal energy storage units is positioned between the condenser and an expansion valve; and
   a bypass capable of bypassing the condenser, allowing during a defrosting stage energy to be only taken from the at least two thermal energy storage units,
   wherein the thermal energy storage system provides detection for a detection and management of frosting conditions and the detection is provided by a plurality of sensors for the measurement of temperature, pressure, and power at points within said system.

2. A thermal energy storage system according to claim 1, wherein at least one of the at least two thermal energy storage units includes a bypass.

3. A thermal energy storage system according to claim 1, wherein the primary coil and secondary coil are connected to further de-frosting or heat storage services.

4. A thermal energy storage system according to claim 1, wherein the heat transfer fluids are one of water, water-glycol mixtures, or refrigerant.

5. A thermal energy storage system according to claim 1, wherein the at least two thermal energy storage units additionally includes internal metal fins co-located with the primary coil or secondary coil.

6. A thermal energy storage system according to claim 1, wherein each of the at least two thermal energy storage units includes the phase change material which is independently selected from formulations containing: one or more waxes; paraffin; one or more fatty acids or salt hydrates thereof; one or more organic-organic eutectic compounds, one or more organic-inorganic eutectic compounds; one or more inorganic-inorganic eutectic compounds; or one or more hygroscopic materials; or any combination thereof.

7. A thermal energy storage system according to claim 1, wherein each of the at least two thermal energy storage units independently includes a corresponding bypass; and wherein said bypass for each of the at least two thermal energy storage units is independently selected from one or more diverter valves, one or more system valves, or one or more solenoid valves.

8. A thermal energy storage system according to claim 1, wherein the bypass is one or more diverter valves, one or more system valves, or one or more solenoid valves.

9. A thermal energy storage system according to claim 1, wherein the secondary coil is dedicated for use with heat transfer fluids, wherein said secondary coil is adapted to exchange heat with the phase change material in each of the at least two thermal energy storage units, and wherein the secondary coil is suitable for connection to further de-frosting or heat storage services within a heat transfer system.

* * * * *